Oct. 31, 1961     E. A. WILKENSON     3,006,187
DEVICE FOR MEASURING AERODYNAMIC ANGLE OF ATTACK
Filed Sept. 14, 1955     3 Sheets-Sheet 2

Inventor
Erik Alvar Wilkenson
By
Attorney

Oct. 31, 1961 E. A. WILKENSON 3,006,187
DEVICE FOR MEASURING AERODYNAMIC ANGLE OF ATTACK
Filed Sept. 14, 1955 3 Sheets-Sheet 3

Inventor
Erik Alvar Wilkenson
By  Milton Jones
Attorney

United States Patent Office 3,006,187
Patented Oct. 31, 1961

3,006,187
DEVICE FOR MEASURING AERODYNAMIC ANGLE OF ATTACK
Erik Alvar Wilkenson, Geneva, Switzerland, assignor to Svenska Aeroplan Aktiebolaget, Linkoping, Sweden, a corporation of Sweden
Filed Sept. 14, 1955, Ser. No. 534,331
2 Claims. (Cl. 73—180)

This invention relates to aircraft instrumentation and refers more particularly to a device for producing an output which is a function of the aerodynamic angle of attack of an aerodyne.

In most problems involving the release of projectiles from an aircraft in flight, as in aerial gunnery or bombardment, the air ocean may be considered as a fixed coordinate system, and the aircraft, the target, and the projectile or projectiles released from the aircraft may be considered to have motion relative to the coordinates as well as to one another. For this reason in certain types of work in which projectiles must be accurately discharged from an aircraft in flight, a setting or correction corresponding to the path of motion of the aircraft relative to the coordinates must be applied to the projectile aiming and/or releasing mechanism.

Since a vehicle which is aerodynamically supported seldom moves in a flight path that exactly coincides with its longitudinal axis, it is important, in connection with work of the type just mentioned, that instrumentalities be provided in the aircraft whereby the divergence between the flight path of the aircraft and its longitudinal axis may be sensed or detected and whereby an output which is a function of that divergence may be produced.

The angle of attack of an aerodynamic supporting surface is the angle between the relative wind, which is the reciprocal of the aircraft's direction of motion through the air, and an arbitrarily selected longitudinal axis that is fixed with respect to the supporting surface; and consequently the angle of attack corresponds to the divergence of the longitudinal axis of the aircraft from the path of motion of the aircraft. Since the displacement of the longitudinal axis of an aircraft from the horizontal or any other predetermined reference orientation may be sensed by gyroscopic means, the true flight path of the vehicle may be ascertained if the output of a gyroscopic sensing apparatus is supplemented by an output corresponding to the angle of attack of a supporting surface on the aircraft. Such an output or function thereof may be furnished either as an instrument reading for the information of the crew or as a mechanical or electrical output to be fed into other instrumentalities by which missiles are aimed and/or released from the aircraft.

The present invention has as its object the provision of improved apparatus for producing an output which will be a function of the aerodynamic angle of attack of an aerodyne throughout a wide range of values of Mach numbers. While it has heretofore been proposed to employ for this purpose a vane mounted on the aircraft for free swinging motion in the air stream, this expedient has several objections, including the fact that such a vane is a cumbersome external part which is readily subject to damage.

It is therefore another object of the present invention to provide means for producing an output corresponding to the aerodynamic angle of attack of an aerodyne wherein the likelihood of mechanical malfunctions is minimized by reason of the fact that the sensing means comprises spaced apart apertures in the skin of the aerodyne communicated with pressure responsive apparatus mounted in the vehicle. It will be appreciated that the employment of sensing means of this type enables the principles of this invention to be applied to the detection not only of the aerodynamic angle of attack in the conventional sense of the term, i.e., as measured in a plane perpendicular to the supporting surfaces of the aerodyne, but also permits measurement of angle of attack about other reference axes on the aerodyne, as for example, the measurement of relative slip or skid of the vehicle as detected at a vertical stabilizing surface.

Still another object of this invention resides in the provision of instrumentalities for producing an output proportional to the aerodynamic angle of attack of an aerodyne throughout a wide range of values of Mach number, wherein pressure inputs to sensing mechanisms carried by the aerodyne are employed to produce outputs of such a nature that they may be fed to an electrical bridge circuit, and the electrical bridge circuit, in turn, is employed to produce the output which is a function of aerodynamic angle of attack of the aerodyne.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which.

Figure 1:
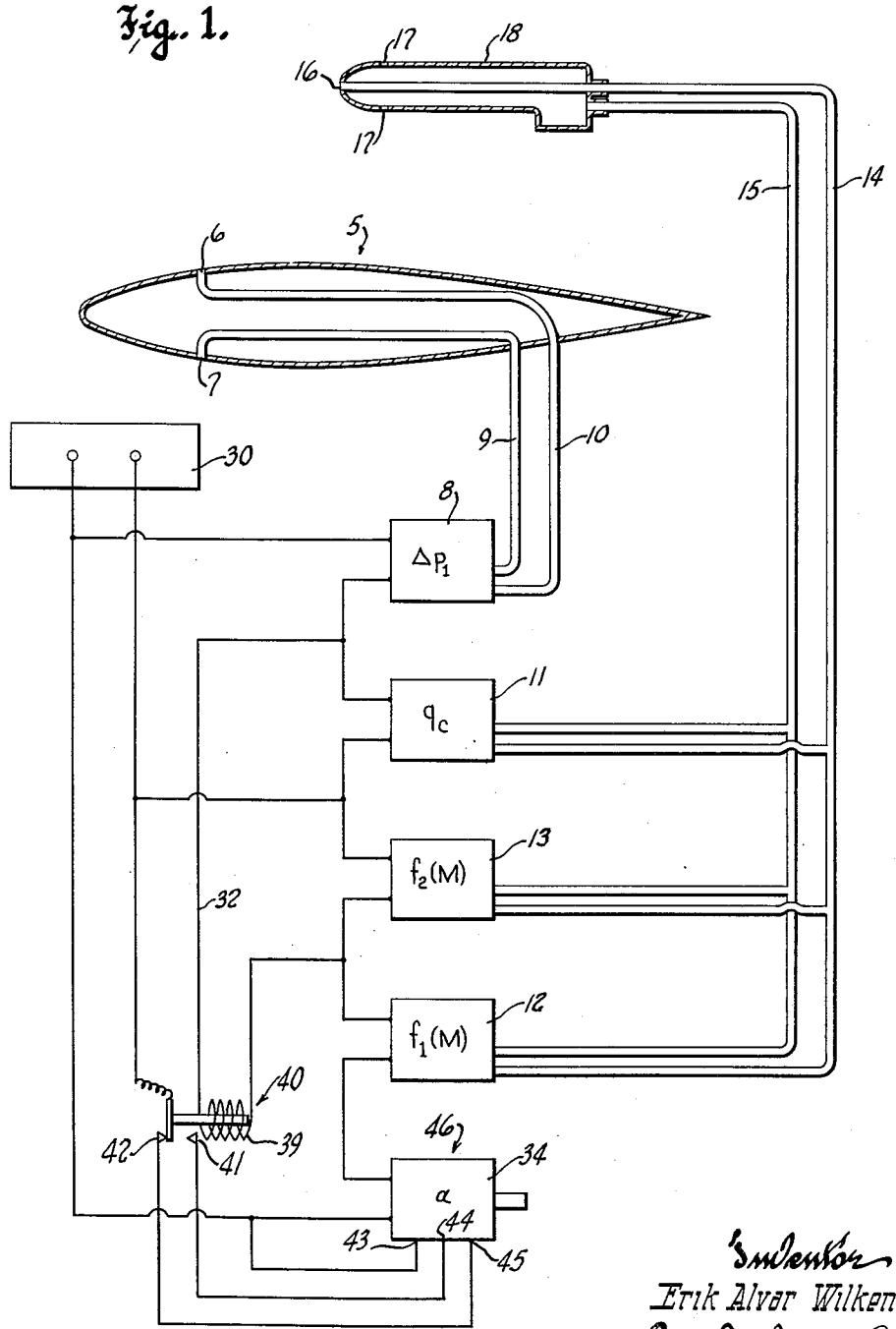
FIGURE 1 is a more or less diagrammatic representation of an apparatus embodying the principles of this invention.

Referring now more particularly to the accompanying drawings, in which like numerals designate like parts throughout the several views, the numeral 5 designates generally a portion of an aerodyne, which in this instance is represented as the cross section of an airfoil of an aircraft. In the airfoil skin are a pair of aperatures 6 and 7, one located at the upper surface and one at the lower surface of the airfoil, and both are spaced about twenty percent of the chord back from the leading edge. It will be understood that the location of these apertures must be so chosen that the air flow over them during flight is representative of the air flow over the entire aerodyne and that a pressure differential between them normally obtains during flight. These apertures provide inlets to a differential manometer instrumentality 8 with which they are respectively connected by means of tubes 9 and 10.

When the aircraft is in flight, the differential pressure $\Delta p_1$ between the two inlets 6 and 7 will be given by:

$$\Delta p_1 = q(k_1 + \alpha k_2)$$

where $q = \rho v^2/2 =$ the dynamic pressure due to the speed $v$ of the aircraft.
$\rho =$ air density.
$\alpha =$ angle of attack measured in a plane perpendicular to the airfoil.
$k_1$ and $k_2 =$ functions of Mach number M of the aircraft.

It will be apparent to those skilled in the art that the values of $k_1$ and $k_2$ cannot be arrived at analytically but must be determined experimentally since the curves for these values vary with the shape of the airfoil in which the inlet apertures 6 and 7 are located, the location of these apertures in the airfoil skin, etc.

It is known from aerodynamics that:

$$M = \sqrt{5[(p_t/p)^{2/7} - 1]} \text{ for } M < 1$$
$$q_c = p_t - p$$
$$q = 0.7\, pM^2$$

where $p$=the static pressure prevailing around the aircraft.
$p_t$=the total pressure prevailing around the aircraft.
$q_c$=the impact pressure corresponding to $p$ and $q$.

Hence $$q_c/q = \frac{p_t/p - 1}{0.7\, M^2} = \frac{(0.2\, M^2 + 1)^{3.5} - 1}{0.7\, M^2} \text{ for } M < 1$$

For $M > 1$ the formula for $q_c/q$ will be somewhat different but may still be written as a function of the Mach number $M$.

For $M = 1$ both formulas will give same value ($q_c/q = 1.276$).

For brevity is written $q_c/q = f(M) =$ a certain function of Mach number.

Further let $k_1/k_2 = f_1(M) =$ another function of Mach number
$f(M)/k_2 = f_2(M) =$ a third function of Mach number Hence $$\frac{\Delta p_1}{q_c} = \frac{\alpha + f_1(M)}{f_2(M)}$$

Figure 4:
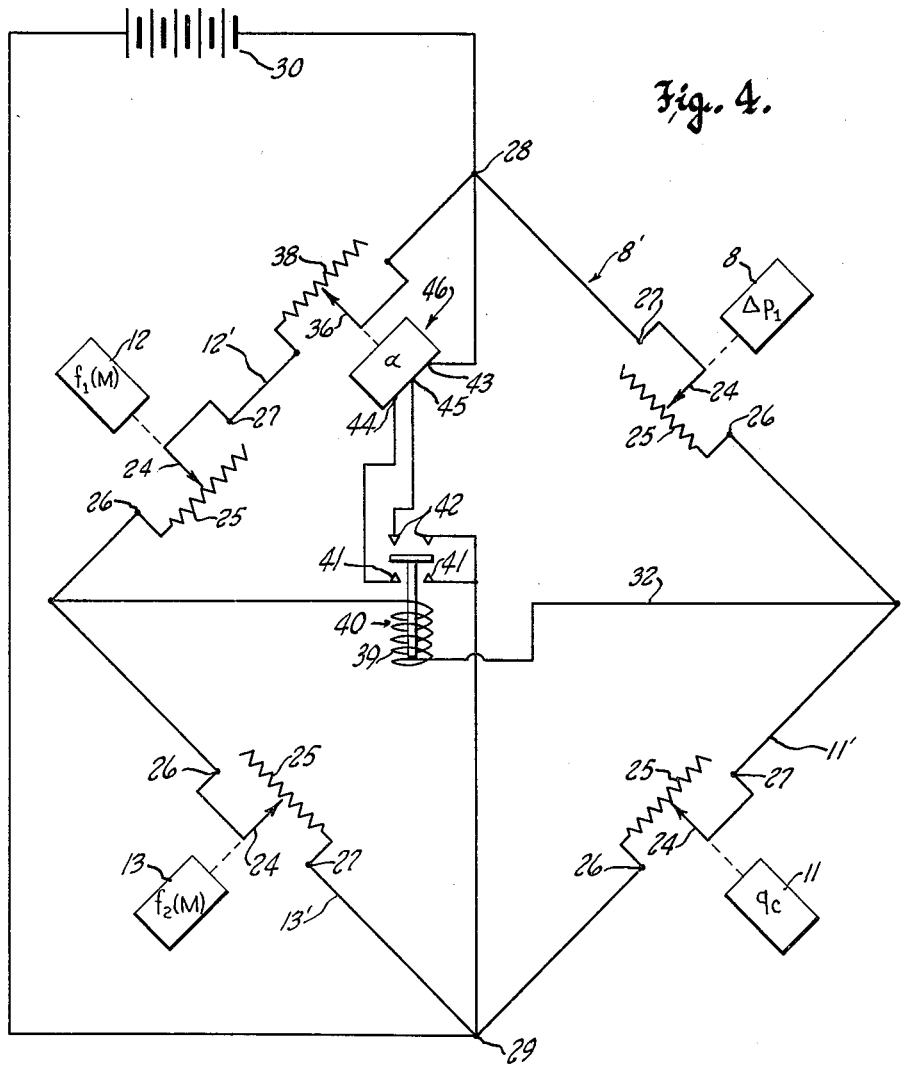
FIGURE 4 is a circuit diagram showing the manner in which the output producing instrumentalities are connected with one another.

This formula is in a form suitable for reproduction in a Wheatstone bridge, and the output of the differential manometer instrumentality 8, which corresponds to the pressure differential $\Delta p_1$ between the manometer inlets, is manifested as the resistance in one leg 8' of a Wheatstone bridge circuit, shown in FIGURE 4.

The resistances in the other three legs 11', 12' and 13' of the Wheatstone bridge circuit depend upon the outputs of a second differential manometer instrumentality 11 and two Mach number instrumentalities 12 and 13, respectively, each of which comprises pressure responsive means connected by means of tubes 14 and 15 with the Pitot inlet 16 (for total pressure) and the static inlet 17 (for static pressure) respectively of a Pitot-static head 18.

Figure 2:
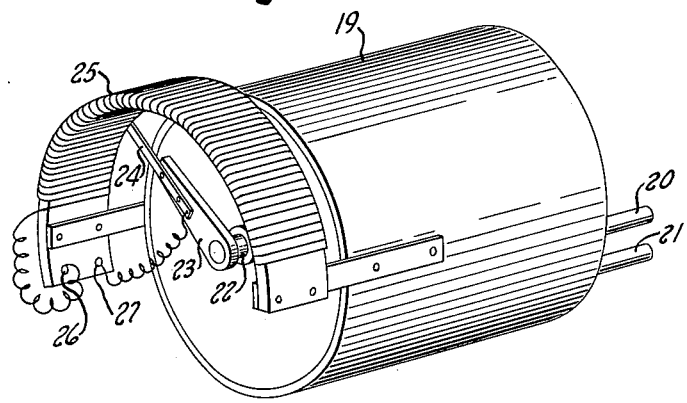
FIGURE 2 is a more or less diagrammatic perspective view of one of the output producing instrumentalities of this invention.

Differential manometer instrumentality 8 is shown more or less schematically in FIGURE 2. It comprises a differential manometer 19, which may be of well-known construction, and details of which are therefore not shown. Its pressure inlets 20 and 21 are connectable with the tubes 9 and 10 in FIGURE 1. The manometer mechanism actuates a rotatable shaft 22 in response to the differential pressure across the manometer which pressure is equal to the differential pressure $\Delta p_1$ between the two inlets 6 and 7 in FIGURE 1. Upon shaft 22 is mounted an insulative arm 23 carrying a flexible conductive wiping finger 24 having sliding engagement with a variable resistance winding 25. One end of the variable resistance winding is connected with a terminal 26, while another terminal 27 is connected with the wiping finger 24, and the terminals of the variable resistance are connected in leg 8' of the bridge circuit, as seen in FIGURE 4.

It will be seen that the angular position of the arm 23 is a function of the pressure differential $\Delta p_1$ and the included resistance of the variable resistance will depend upon said angular position of the arm and the resistance characteristics of the variable resistance winding, the latter being so dimensioned and calibrated as to provide an included resistance which at all times is proportional to the value $\Delta p_1$.

The differential manometer instrumentality 11 is of the same construction as differential manometer instrumentality 8 and can be shown by a figure identical to FIGURE 2. The description given for differential manometer instrumentality 8 will apply in all respects except so far as follows. Pressure inlets 20 and 21 are connectable with tubes 14 and 15 in FIGURE 1, by which shaft 22 will rotate in response to pressure $p_t - p = q_c$. The terminals of the variable resistance are connected to leg 11' in FIGURE 4. The variable resistance winding is so dimensioned and calibrated as to provide an included resistance which at all times is proportional to value $q_c$.

Mach number instrumentalities 12 and 13 can also be shown by figures identical to FIGURE 2, and the description given for differential manometer instrumentality 8 will apply except as follows. Differential manometer 19 is exchanged for a Mach meter, which may be of well-known construction, e.g. of the type shown in U.S. Patent No. 2,522,337, details being therefore not shown here. Pressure inlets 20 and 21 are connectable with tubes 14 and 15 in FIGURE 1, by which shaft 22 (item 43 in the cited U.S. patent) will rotate in response to Mach number $M$. The terminals of the variable resistance are connected to leg 12' in FIGURE 4 for Mach number instrumentality 12 and to leg 13' in the same figure for Mach number instrumentality 13. The variable resistance windings are so dimensioned and calibrated as to provide included resistances which are at all times proportional to $f_1(M)$ and $f_2(M)$ respectively.

The applied voltage terminals 28, 29 of the bridge circuit shown in FIGURE 4 are connected with the opposite terminals of a current source 30, and both the direction of the current flow in the bridging conductor 32 of the circuit and the value of the current flowing therethrough will be dependent upon the included resistances of the four variable resistances. As well known to those skilled in the art the Wheatstone bridge circuit is said to be in balance when the current flow in the bridging conductor 32 is equal to zero. This happens if the product of the resistances of two opposite legs is equal to the product of the resistances of the other two opposite legs.

Figure 3:
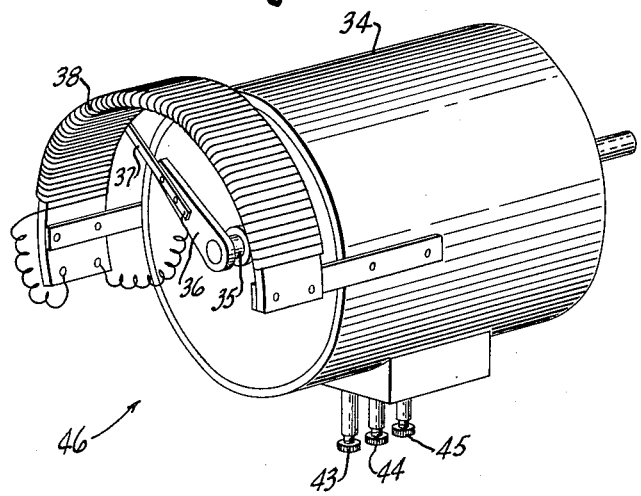
FIGURE 3 is a view similar to FIGURE 2 but showing the output producing instrumentality of this invention.

The bridge circuit is at all times automatically maintained in balance by means of the output instrumentality 46 shown more or less schematically in FIGURE 3, which instrumentality also produces an output that is a function of angle of attack. The output instrumentality comprises a reversible electric servo-motor 34, the shaft 35 of which has an insulative arm 36 mounted thereon, and this arm carries a flexible conductive wiping finger 37 having engagement with a variable resistance winding 38, the arrangement being similar to that of the variable resistances in the manometer and Mach number instrumentalities. The variable resistance of the output instrumentality 46 is by its terminals connected in series with the variable resistance of the Mach number instrumentality 12, and is included in leg 12' of the bridge in FIGURE 4.

Connected in series with the bridging conductor 32 of the bridge circuit is the coil 39 of a polarized relay 40 having one set of contacts 41 which is closed when current flows through the bridging conductor in one direction and another set of contacts 42 which is closed in consequence of current flow through the bridging conductor in the opposite direction.

One terminal 43 of the servo-motor is at all times connected with one terminal of the current source, and the relay contacts 41 and 42 are connected with terminals 44 and 45 of the servo-motor in such a manner that the output instrumentality will at all times tend to bring the bridge circuit into balance. More specifically, when current flows in the bridging conductor 32, the polarized relay 40 will be energized to close one of its sets of contacts, thus energizing the servo-motor for rotation in the proper direction to swing the wiping finger 37 across the variable resistance winding 38 to a position in which current flow through the bridging conductor 32 will go to zero, de-energizing the polarized relay coil and thus opening both sets of relay contacts to stop rotation of the servo-motor.

It will now be seen that the included resistances of the several variable resistances connected in the bridge circuit will at all times correspond to functions of the inputs to the instrumentalities of which they comprise parts, and that the bridge circuit will always be kept in balance by the servo-motor of the output instrumentality 46, from which the angle of attack may be read either in terms of the angular position of the arm 36 of the output instrumentality 46 or in terms of the included resistance in the output instrumentality variable resistance winding 38.

Further, as described above the included resistance of the following legs of the Wheatstone bridge circuit, as shown in FIGURE 4, are proportional to the following values

| Leg: | Value |
|---|---|
| 8' | $\Delta p_1$ |
| 11' | $q_c$ |
| 12' | $f_1(M) + \alpha$ |
| 13' | $f_2(M)$ |

As the bridge is at all times in balance the following equation will apply $$K_1 \Delta p_1 \times K_2 f_2(M) = K_3 q_c \times K_4 [f_1(M) + \alpha]$$

where $K_1$, $K_2$, $K_3$ and $K_4$ are constant scale factors for resistances respectively. If these are so chosen that $$K_1 K_2 = K_3 K_4$$

it is obtained $$\frac{\Delta p_1}{q_c} = \frac{\alpha + f_1(M)}{f_2(M)}$$

which means that the earlier deduced equation in column 3, line 35, is satisfied.

From the foregoing description taken together with the accompanying drawings it will be apparent that this invention provides means for producing an output which is a function of angle of attack of an aerodyne, which means employs instrumentalities for sensing the static pressures at two spaced locations on the aerodyne at which a pressure differential normally obtains during flight, in cooperation with means for sensing other pressure values readily ascertainable with known instrumentalities, and that the apparatus of this invention, being independent of vanes and similar devices which produce a mechanical response to changes in air flow about an aerodyne, provides very accurate outputs through a wide range of Mach numbers.

What I claim as my invention is:

1. Means for determining the aerodynamic angle of attack of an aerodyne, which comprises: means on the aerodyne for sensing the pressures at two spaced locations on the surface of the aerodyne between which locations a pressure differential normally obtains in consequence of flight; means defining a Wheatstone bridge circuit; means connected with said two spaced sensing means for imposing upon one leg of the Wheatstone bridge circuit a resistance which is proportional to the difference between the pressures existing at said two spaced locations; instrumentalities for producing an output which is proportional to the impact pressure due to the forward movement of the aerodyne; means for imposing upon a second leg of the Wheatstone bridge circuit a resistance which is proportional to the output of said impact pressure responsive instrumentalities; instrumentalities for producing an output which is a function of Mach number and of an empirically-determined constant for the aerodyne; means for imposing upon a third leg of the Wheatstone bridge circuit a resistance which is a predetermined function of Mach number and of an empirically determined constant for the aerodyne; means for imposing upon the fourth leg of said Wheatstone bridge circuit a resistance which is another predetermined function of the Mach number of the aerodyne; means for also imposing upon said fourth leg of the Wheatstone bridge circuit a variable resistance; and means for adjusting said variable resistance to whatever value will balance the bridge circuit so that the resistance value of said variable resistance when the bridge circuit is in equilibrium will be proportional to the angle of attack of the aerodyne.

2. Means for generating an output which is proportional, through a wide range of values of Mach number, to the aerodynamic angle of attack of an aerodyne having an airfoil, said means comprising: means defining a Wheatstone bridge circuit having variable resistances in each of its legs; means on the aerodyne for sensing the differential between the pressures at two spaced locations on the airfoil of the aerodyne, between which locations a pressure difference normally exists in consequence of flight, and for adjusting the electrical resistance of one leg of the Wheatstone bridge to a value proportional to the pressure difference sensed; means including a Pitot-static tube for sensing the impact pressure due to forward movement of the aerodyne and for adjusting the electrical resistance of a second leg of the Wheatstone bridge to a value proportional to the impact pressure thus sensed; means including a Pitot-static tube for adjusting the electrical resistance of a third leg of the Wheatstone bridge to a value which is proportional to a function of Mach number and of an empirically determined constant for the aerodyne; means for adjusting the electrical resistance of a fourth leg of the Wheatstone bridge to a value which is proportional to another function of Mach number; means for adjustingly adding and subtracting electrical resistance in one of the legs of the Wheatstone bridge in amounts such as to at all times maintain the bridge in balance, and for producing an output which is a function of the amount of resistance so added or subtracted, which output will at all times be proportional to the aerodynamic angle of attack of the aerodyne.

References Cited in the file of this patent

UNITED STATES PATENTS

| | | |
|---|---|---|
| 1,588,178 | Fales | June 8, 1926 |
| 2,137,194 | Weber | Nov. 15, 1938 |
| 2,579,220 | Vine | Dec. 18, 1951 |
| 2,714,309 | Redemske | Aug. 2, 1955 |
| 2,761,315 | Anderson et al. | Sept. 4, 1956 |
| 2,775,124 | Gardner et al. | Dec. 25, 1956 |

FOREIGN PATENTS

| | | |
|---|---|---|
| 517,321 | Great Britain | Jan. 29, 1940 |